Patented Aug. 16, 1927.

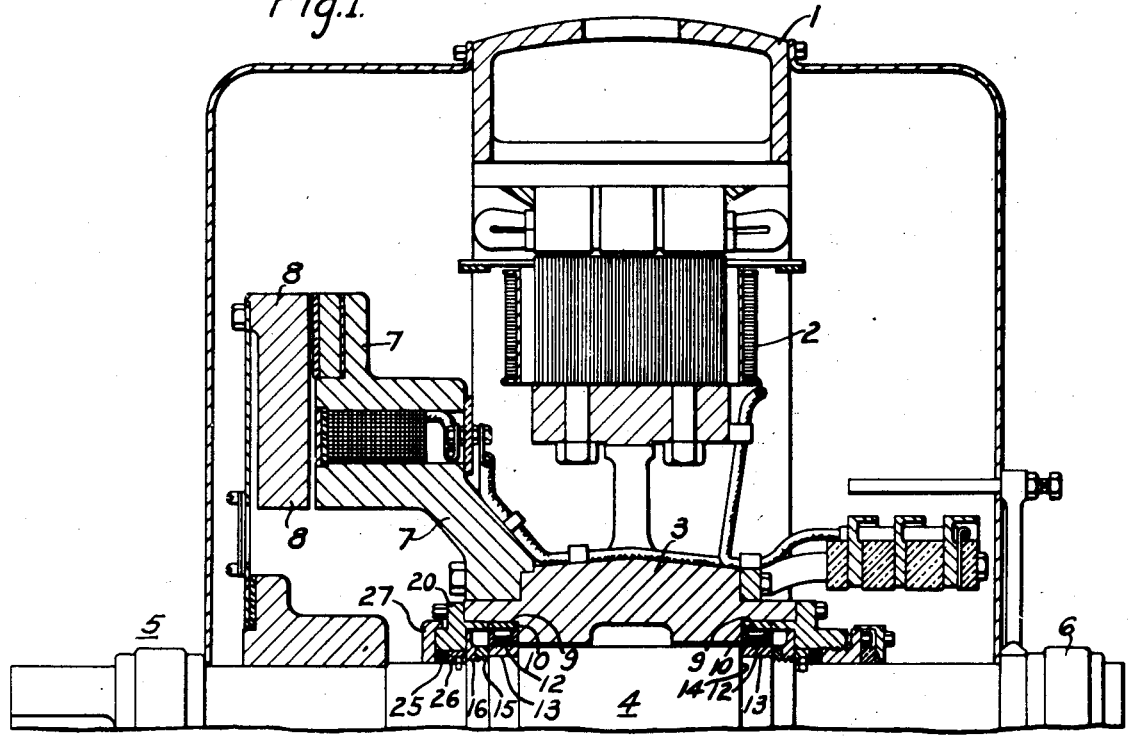
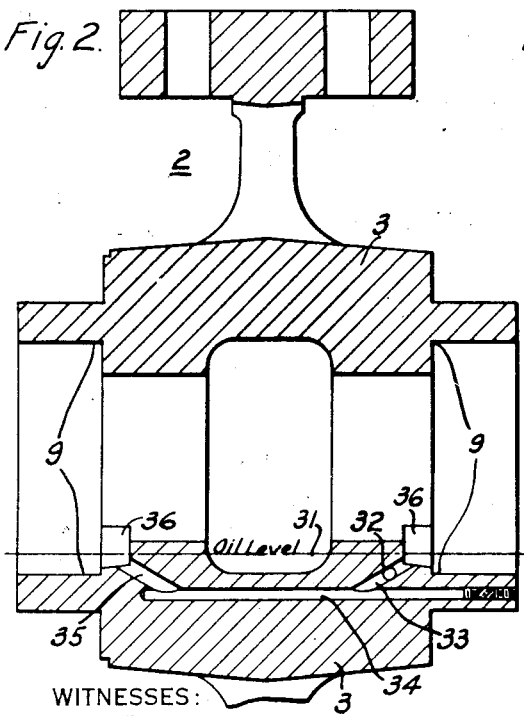
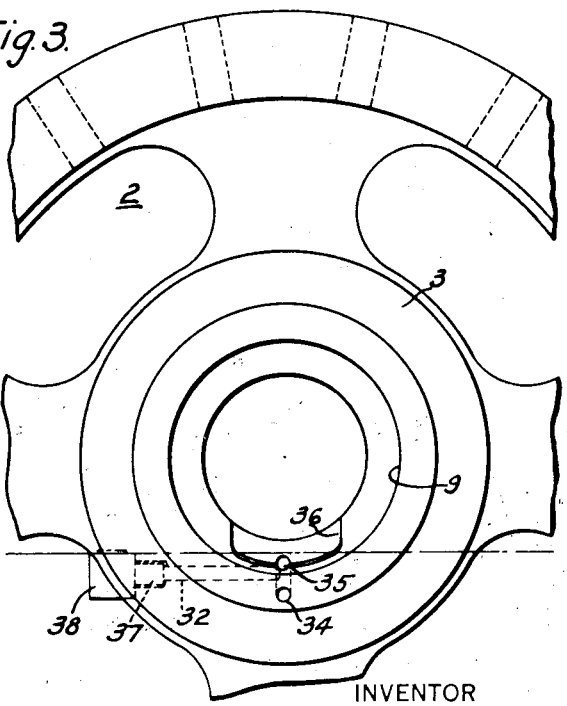

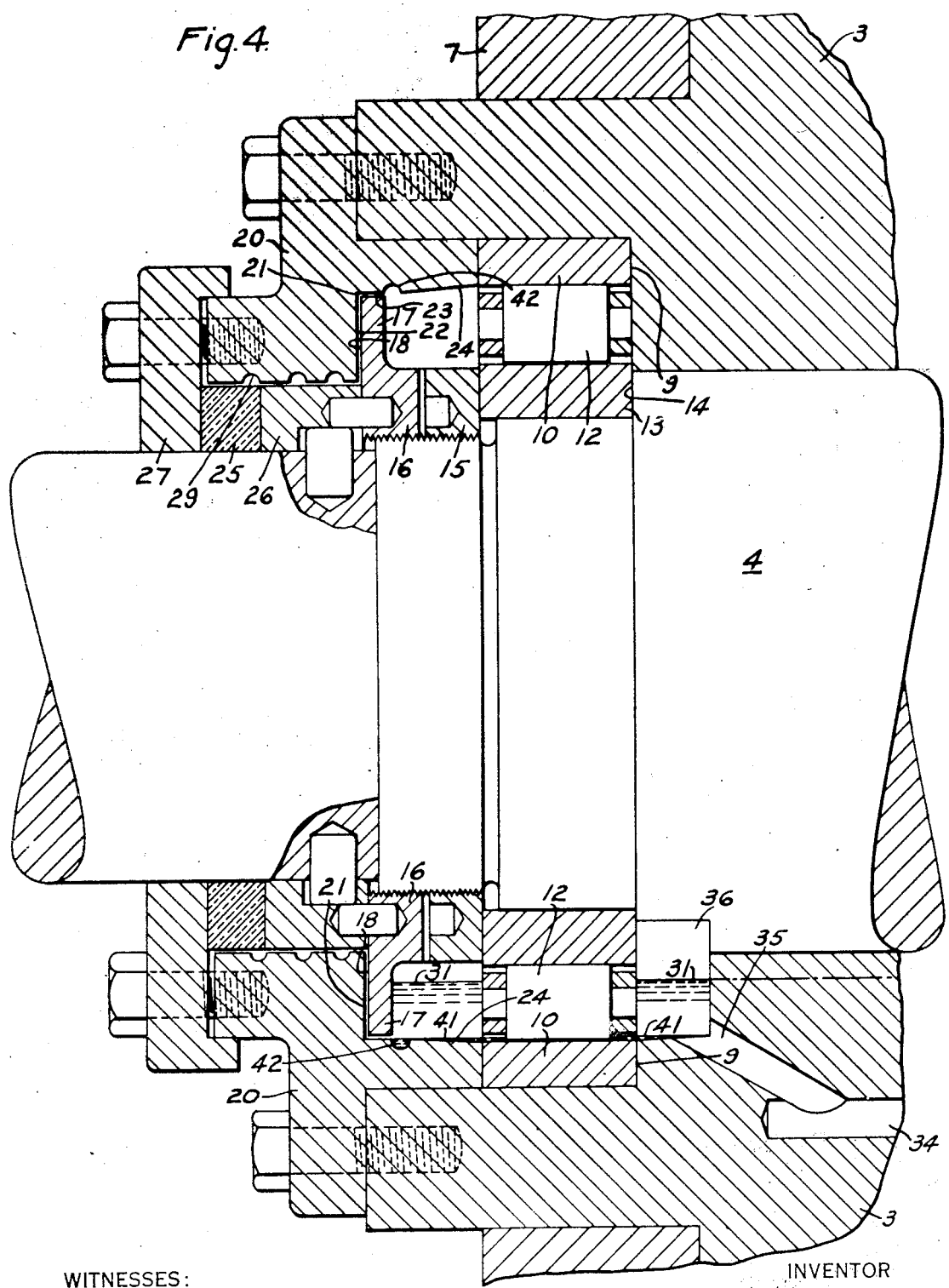

1,638,959

UNITED STATES PATENT OFFICE.

RAOUL PRUGER, OF EAST LIBERTY, PENNSYLVANIA, ASSIGNOR TO WESTINGHOUSE ELECTRIC & MANUFACTURING COMPANY, A CORPORATION OF PENNSYLVANIA.

ROLLER BEARING FOR CLUTCH MOTORS.

Application filed August 7, 1926. Serial No. 127,873.

My invention relates to oil-lubricated roller bearings for supporting rotor members on stationary shafts, and it has particular relation to electric motors having their rotor members operable, at times, to rotate freely on the driving shafts without transmitting torque to load devices which are connected to the shafts, the rotor members being supported on roller bearings which must not be permitted to leak oil on account of the very deleterious effect of the oil on the operative parts of the electric motors.

An object of my invention is to provide roller bearings of an improved type, for mounting a rotating member upon a stationary shaft. Such bearings have heretofore been usually of the grease-packed type and, when they have been lubricated with oil, the leakage of oil has been poorly controlled. The leakage of oil not only necessitates frequent fillings in order to maintain the bearings but it effectually prevents the utilization of the bearing in an electric motor, wherein the leakage of oil into the windings and ventilating ducts cannot be tolerated.

The development of synchronous clutch motors has been retarded for a long time for want of really practical bearings for rotatably mounting the rotor members on their shafts.

With the foregoing and other objects in view, my invention consists in the details and combinations hereinafter described and claimed and illustrated in the accompanying drawing, wherein—

Fig. 1 is a longitudinal section view of the top half of a synchronous clutch motor embodying my invention, Fig. 2 is a longitudinal sectional detail view of the hub of the rotor spider, Fig. 3 is an end elevation of the structure shown in Fig. 2, and Fig. 4 is a sectional detail view of one of the bearings.

As shown in the drawings, my invention is applied to a synchronous clutch motor comprising a stator member 1 and a rotor member 2, the latter comprising the field member of the synchronous motor. The hub 3 of the rotor member is loosely mounted upon the driving shaft 4 of the motor, said shaft being supported in stationary bearings 5 and 6. The rotor member 3 may be mechanically connected to the driving shaft, at any time, by means of a magnetic clutch comprising a clutch field member 7 which is carried by the rotor member and a clutch armature member 8 which is carried by the shaft.

The rotor hub 3 is provided, at each end, with a recess 9 for receiving the outer race 10 of a roller bearing comprising a plurality of cylindrical, spherical or conical rollers 12. The inner race 13 of each roller bearing is carried by the shaft.

As shown in detail in Fig. 4, the inner race 13 of the roller bearing is held in place, against the shoulder 14 on the shaft, by means of a lock nut 15, and a second lock nut 16 is also provided in engagement with the first lock nut, the second nut being provided with a radial flange 17 having a smooth plane back surface 18 facing away from the roller bearing.

A bearing housing cap 20 is secured to the rotor hub member 3 and is provided with a machined recess 21 having a radial plane surface 22 spaced a capillary distance from the corresponding surface 18 of the lock nut 16 on the shaft. The housing cap 20 is provided also with an annular recess 23 having a wall 24 which is preferably flared outwardly from the recess 21 and terminates at the edge of the outer race 10 of the bearing.

A thrust collar 25 of self lubricating construction, such as a cast-iron collar provided with graphite plugs, is disposed between a spacer 26, which is locked to the flanged lock nut 16, as well as being keyed to the shaft 4, and a closing cap 27, which is secured to the housing cap 20. The housing cap 20 is bored to receive the thrust collar 25 and the spacer 26 and may be provided with the usual oil-catching grooves 29 for catching any oil which may leak that far out of the roller bearing.

When the rotor member is stationary, the oil level 31, as shown in Fig. 4, is such that the oil is retained, without overflow, in the bottom of the annular chamber which is bounded, on one side, by the recess 9 in the rotor member and, on the other side, by the outer race 10 of the roller bearing and the recess of cavity 21 of the housing cap 20.

Suitable filling means are provided, comprising filling ducts or holes 32, 33, 34 and 35, feeding into recesses 36 in the side of each of the outer races 9 of the hub member 3, the oil-filling hole 32 communicating with a pipe 37 which terminates in a combined filling and overflow plug 38. The rotor member is suitably marked, by means not shown, to indicate the position which the rotor member must assume during the filling operation in order to obtain the desired oil level in the bearings. In this way, the bearings may be filled until the filling plug 38 overflows, whereupon the same may be closed, and the overflow oil may be wiped off the rotor member at a readily accessible point without causing any overflow within the bearings themselves.

The synchronous clutch motor to which my improved bearing is applied is designed not only to operate with its rotor member freely rotating on the shaft during the starting period necessary to bring the rotor member up to synchronous speed with the load detached, but it is also designed to operate continuously, for indefinitely long periods of times, when the load is shut down, to supply power-factor correcting currents as a synchronous condenser. Hence, it is necessary for the roller bearings to be designed not merely for intermittent starting service but for a continuous operation.

When the rotor member is rotating, carrying with it the outer race 10 and the housing cap 20, the oil is thrown out by centrifugal force to the outer periphery of the annular chamber limited by the outer race 10 and the flaring surface 24 of the cavity in the housing cap, as indicated by the oil level 41 in Fig. 4.

Preferably, the level 41 of the rotating oil is such that the radial flange 17 of the lock nut 16 on the shaft does not dip into the oil during rotation, but this is not absolutely essential, as any oil which may get into the space between the two radial flange surfaces 18 and 22 will be thrown out by the combined actions of centrifugal force and capillary action.

The flared surface 24 of the recess in the housing cap 20 serves to feed the oil continuously, by centrifugal action, to the outer race of the roller bearing, thus insuring a copious supply of oil for the rollers 12 at all times.

When the motor comes to rest, the oil clinging to the periphery of the flared surface 24 gradually recedes, an annular groove 42 being provided in said flared surface, at a point about opposite to the inner face of the nut-flange 17, for the purpose of causing the oil to drip off into the oil chamber of the bearing instead of dripping off into the capillary space 18, 21 outside of the bearing.

While I have described my invention in a preferred embodiment, it is obvious that many alterations and modifications may be adopted by those skilled in the art without departing from the spirit and scope of my invention. I desire, therefore, that the appended claims shall be accorded the broadest interpretation consistent with their language and the prior art.

I claim as my invention:

1. The combination with a stationary shaft and a rotor member rotatably mounted thereon, of an oil-lubricated roller bearing comprising inner and outer races supported by said shaft and said rotor member, respectively, and a housing member carried by said rotor member in juxtaposition to said outer race and having a flaring annular cavity opening onto said outer race, the lubricating oil being of such quantity as to be retained, without overflow, in the bottom of the annular chamber provided by said rotor member, said outer race and the cavity of said housing member when the rotor is at rest, the oil being thrown to the outer periphery of said chamber when the rotor is rotating and being maintained in said outer race by the flaring shape of said cavity and the effect of centrifugal force.

2. The combination with a stationary shaft and a rotor member rotatably mounted thereon, of an oil-lubricated roller bearing comprising inner and outer races supported by said shaft and said rotor member, respectively, a radially flanged member surrounding said shaft adjacent to said inner race, the flange of said member being provided with a plane radial surface facing away from said bearing, a housing member carried by said rotor member, and thrust-bearing means for preventing relative end play of said shaft and said rotor member, said housing member being provided with a recess having a plane radial surface spaced a capillary distance from the first-mentioned plane radial surface, said housing member being also provided with an annular cavity opening from said recess onto said outer race, the lubricating oil being of such quantity as to be retained, without overflow, in the bottom of the annular chamber provided by said rotor member, said outer race and the cavity and recess of said housing member when the rotor is at rest, the oil being thrown to the outer periphery of said chamber when the rotor is rotating and being maintained in said outer race by the effect of centrifugal force.

3. The combination with a stationary shaft and a rotor member rotatably mounted thereon, of an oil-lubricated roller bearing comprising inner and outer races supported by said shaft and said rotor member, respectively, a radially flanged member surrounding said shaft adjacent to said inner race, the flange of said member being provided with a plane radial surface facing away from said bearing, a housing member carried by said rotor member, and thrust-bearing means for preventing relative end play of said shaft and said rotor member, said housing member being provided with a recess having a plane radial face spaced a capillary distance from the first-mentioned plane radial surface, said housing member being also provided with a flaring annular cavity opening from said recess onto said outer race, the lubricating oil being of such quantity as to be retained, without overflow, in the bottom of the annular chamber provided by said rotor member, said outer race and the cavity and recess of said housing member when the rotor is at rest, the oil being thrown to the outer periphery of said chamber when the rotor is rotating and being maintained in said outer race by the flaring shape of said cavity and the effect of centrifugal force.

4. The combination with a stationary shaft and a rotor member rotatably mounted thereon, of an oil-lubricated roller bearing comprising inner and outer races supported by said shaft and said rotor member, respectively, a radially flanged member surrounding said shaft adjacent to said inner race, a housing member carried by said rotor member, and thrust-bearing means for preventing relative end play of said shaft and said rotor member, said housing member having a recess and a flaring annular cavity opening from said recess onto said outer race, the flaring surface of said cavity having an oil-shedding means disposed adjacent to the inner surface of the radial flange of the shaft-carried member.

5. The combination with a stationary shaft and a rotor member rotatably mounted thereon, of an oil-lubricated roller bearing comprising inner and outer races supported by said shaft and said rotor member, respectively, a housing member carried by said rotor member in juxtaposition to said outer race, and having an annular cavity adjacent to said outer race, the lubricating oil being of such quantity as to be retained, without overflow, in the bottom of the annular chamber provided by said rotor member, said outer race and the cavity of said housing member when the rotor is at rest, the oil being thrown to the outer periphery of said chamber when the rotor is rotating and being maintained in said outer race by the effect of centrifugal force, and means for adding oil to said bearing when the rotor member is stationary, said means comprising a pipe terminating in a filling plug having means for preventing the accumulation of an excessive quantity of oil in the bearing.

In testimony whereof, I have hereunto subscribed my name this 28th day of July, 1926.

RAOUL PRUGER.